United States Patent [19]

Miura et al.

[11] Patent Number: 4,937,298

[45] Date of Patent: Jun. 26, 1990

[54] PROCESS FOR PRODUCING STYRENE/(METH)ACRYLIC ACID COPOLYMER

[75] Inventors: Yoshikiyo Miura; Kyotaro Shimazu, both of Chiba, Japan

[73] Assignee: Dainippon Ink and Chemicals, Inc., Tokyo, Japan

[21] Appl. No.: 322,924

[22] Filed: Mar. 14, 1989

[30] Foreign Application Priority Data

Mar. 17, 1988 [JP] Japan .................................. 63-61929

[51] Int. Cl.⁵ ........................... C08F 2/02; C08F 2/04; C08F 220/06
[52] U.S. Cl. ........................................ 526/66; 526/65; 526/88; 526/317.1; 526/318.6; 526/272
[58] Field of Search ............. 526/65, 66, 318.6, 317.1, 526/88

[56] References Cited

U.S. PATENT DOCUMENTS

| | | | |
|---|---|---|---|
| 3,839,308 | 10/1974 | Carrock | 526/318.6 X |
| 4,287,262 | 9/1981 | Engelhard et al. | 526/65 X |
| 4,607,086 | 8/1986 | Sutter et al. | 526/66 X |

FOREIGN PATENT DOCUMENTS

| | | | |
|---|---|---|---|
| 49-85184 | 8/1974 | Japan | 526/318.6 |
| 278510 | 12/1986 | Japan | 526/318.6 |
| 1171467 | 8/1985 | U.S.S.R. | 526/318.6 |

Primary Examiner—Joseph L. Schofer
Assistant Examiner—F. M. Teskin
Attorney, Agent, or Firm—Sherman and Shalloway

[57] ABSTRACT

A process for producing a styrene/(meth)acrylic acid copolymer continuously by a bulk or solution polymerization technique, wherein the polymerization is carried out continuously by using at least two polymerization vessels arranged in series and equipped with a mixing device while (meth)acrylic acid is continuously fed into each of the polymerization vessels.

13 Claims, 1 Drawing Sheet

PROCESS FOR PRODUCING STYRENE/(METH)ACRYLIC ACID COPOLYMER

This invention relates to a process for producing a styrene/acrylic acid copolymer or a styrene/methacrylic acid copolymer [to be generically referred to as styrene/(meth)acrylic acid copolymer] which has excellent transparency, heat resistance and moldability and is useful as an injection-molding and extrusion molding materials.

Polystyrene resins and acrylic resins have previously been known as transparent resins having excellent moldability. They, however, have the defect of being inferior in heat resistance, particularly in heat distortion temperature.

On the other hand, polycarbonate resins are known as thermoplastic resins having both heat resistance and transparency. However, these resins have not come into widespread acceptance because of their poor moldability and high price.

A styrene/methacrylic copolymer resin (abbreviated as SMAA resin hereinafter) is known as a resin having improved heat resistance while retaining the excellent moldability and transparency of polystyrene resin.

A suspension polymerization method and a continuous polymerization method are generally used for the production of the SMAA resin. The suspension polymerization method is disclosed, for example, in Japanese Laid-Open Patent Publication No. 85184/1974. The continuous polymerization method is disclosed, for example, in U. S. Pat. No. 3,085,033 and Japanese Laid-Open Patent Publication No. 278510/1986.

The suspension polymerization method can give SMAA resin having excellent heat resistance and processability. However, since it uses a dispersing agent, the resin is liable to undergo coloration. Furthermore, since it is carried out batchwise, its productivity is low.

On the other hand, the conventional continuous process for producing SMAA resin is carried out by using a single polymerization vessel. In such a single vessel continuous polymerization method, the amount of heat of polymerization generated by the polymerization reaction is proportional to the inner capacity of the polymerization vessel, and the amount of the heat of polymerization removed is proportional to the area of a heat transfer surface. From an economical standpoint, it is difficult to secure the required heat removing area in the polymerization vessel itself, and it is necessary to remove the heat externally of the polymerization vessel by, for example, installing a circulating line outside of the vessel. The equipment therefore becomes complex.

To avoid this inconvenience, it would be possible to secure the required heat removing area by providing a plurality of polymerization vessels in series. One could obtain SMAA copolymer by providing two or more polymerization vessels equipped with a mixing device in series, polymerizing a mixture of styrene and (meth)acrylic acid continuously while feeding it continuously from one side of the polymerization apparatus and removing the solvent continuously from the polymerization mixture obtained from the final polymerization vessel. However, molded articles produced from the resulting copolymer have flow marks and present a markedly degraded appearance.

This is a great disadvantage in regard to the utility of the styrene/(meth)acrylic acid copolymer. For example, molded articles of SMAA resin intended for optical applications require heat resistance and high light perviousness because they are used near light sources and light passes through them. Food containers for use in electric ovens, another important use, also require heat resistance and high transparency in order to heat the foods and permit viewing of the foods from outside.

It is an object of this invention to remove the aforesaid defects of the technique of producing a styrene/(meth)acrylic acid copolymer in at least two series-arranged polymerization vessels equipped with a mixing device. A more specific object of this invention is to provide a new process for producing SMAA resin having high transparency and heat resistance by using at least two series-connected polymerization vessels equipped with a mixing device which are suitable for commercial production.

The above objects of the invention are achieved by a process for producing a styrene/(meth)acrylic acid copolymer continuously by a bulk or solution polymerization technique wherein the polymerization is carried out at least substantially continuously by using at least two polymerization vessels arranged in series and each being equipped with a mixing device while acrylic or methacrylic acid, preferably methacrylic acid, is at least substantially continuously fed into each of the polymerization vessels, and preferably while (meth)acrylic acid containing 30 to 400 ppm of a polymerization inhibitor is fed at least substantially continuously into the polymerization vessels in which the contents have a viscosity of at least 30 poises.

The SMAA resin produced by the process of this invention can be molded into articles having high heat resistance, a very low haze value and excellent transparency without the occurrence of flow marks.

The terms "at least substantially continuously fed" or "at least substantially continuous feeding or equivalent of (meth)acrylic acid, as described herein, means the case of continuous feeding, as well as intermittent feeding of (meth)acrylic acid in which periods of stopping the feeding are short and which therefore is substantially the same as the continuous feeding. The feeding of (meth)acrylic acid into the polymerization vessel also means the feeding of (meth)acrylic acid into a conveying pipe leading to the polymerization vessel The process of this invention may be carried out, for example, by the following procedure. First, while a solution composed of styrene, (meth)acrylic acid and a solvent is at least substantially continuously fed into a first polymerization vessel equipped with a mixing device, the monomers are polymerized by maintaining the temperature of the inside of the vessel at about 100 to 160° C. Then, the polymerization mixture is at least substantially continuously conveyed from the first polymerization vessel to a second polymerization vessel. At this time, (meth)acrylic acid is added directly to the second polymerization vessel or to a conveying pipe leading from the first polymerization vessel to the second polymerization vessel, and the polymerization is carried out in the same way as in the first polymerization vessel. When a third polymerization vessel following the second one is used, (meth)acrylic acid is at least substantially continuously added directly to the third polymerization vessel or to the polymerization mixture being conveyed from the second to the third polymerization vessel.

The number of polymerization vessels arranged in series in this invention may be at least 2, and is not particularly limited. From an economical standpoint, it is preferably 2 to 6. (Meth)acrylic acid to be fed to the second and subsequent vessels or conveying pipes is preferably used after dilution with styrene or a mixture of styrene and a solvent. The dilution ratio is desirably not more than 50, preferably 0.5 to 20, to (meth)acrylic acid in view of productivity.

The amount of (meth)acrylic acid to be fed to each of the polymerization vessels may be properly selected depending upon the properties of the desired styrene/(meth)acrylic acid copolymer and the polymerization conditions such as the rate of formation of the acrylic acid to be fed is set at ±30% by weight, preferably ±15% by weight, of the aimed content (% by weight) of (meth)acrylic acid in the copolymer so that the contents of (meth)acrylic acid in the styrene/(meth)acrylic acid copolymer formed in the individual polymerization vessels become substantially the same. This amount of (meth)acrylic acid to be fed may be determined, for example, by calculation on the basis of the reactivity ratio of styrene and (meth)acrylic acid usually known from the copolymerization theory, or by performing experiments.

The concentration of the styrene/(meth)acrylic acid copolymer in the polymerization mixture in each polymerization vessel is properly selected depending upon productivity and the heat removing ability and stirring ability of the polymerization apparatus. For example, when three polymerization vessels are used, it is preferably increased progressively from the first to the third vessels, for example, 20% to 35% by weight in the first vessel, 30% to 50% by weight in the second vessel, and 40% to 70% by weight in the third vessel.

In a preferred embodiment of this invention, (meth)acrylic acid containing 30 to 400 ppm of a polymerization inhibitor is fed into the polymerization vessel or the polymerization mixture in a conveying pipe leading to that polymerization vessel when the contents of the polymerization vessel have a viscosity of at least 30 poises and are within the range of viscosities at which the contents can be stirred, preferably a viscosity in the range of 30 to 5,000 poises. Styrene/(meth)acrylic acid copolymer obtained by at least substantially continuously feeding (meth)acrylic acid containing the polymerization inhibitor can be molded into articles having a very low haze and excellent transparency without the occurrence of flow marks.

The polymerization inhibitor used in this invention may be, for example, an aromatic compound containing a benzene ring substituted by at least one hydroxyl group. Typical examples are t-butyl catechol, hydroquinone, p-methoxyphenyl, p-ethoxyphenol and 2,4-dimethyl-6-t-butylphenol. Addition of the polymerization inhibitor in an amount of 30 to 400 ppm based on the (meth)acrylic acid is advantageous because a highly transparent styrene/(meth)acrylic acid copolymer can be obtained without coloration or a reduction in the rate of polymerization.

In the process of this invention, a mixture comprising the polymer, the monomers and the solvent in the final polymerization vessel is transferred to a solvent removing vessel where the polymer is separated from the monomers, the solvent and other materials. The monomers and the solvent recovered are usually purified and again used as starting materials. The amount of (meth)acrylic acid so recycled from the polymerization system is usually about 5 to 40% by weight based on the (meth)acrylic acid used. When the recovered (meth)-acrylic acid is to be at least substantially continuously fed into the polymerization vessel in which the contents have a viscosity of at least 30 poises, or into the conveying pipe through which the polymerization mixture is conveyed, it is also preferred to add the polymerization inhibitor in an amount of 30 to 400 ppm based on the (meth)acrylic acid. The polymerization inhibitor may be directly added to (meth)acrylic acid, or the (meth)acrylic acid may be mixed with the monomers containing the polymerization inhibitor or the solvent.

Examples of solvents used to dilute (meth)-acrylic acid include aromatic hydrocarbons such as toluene, xylene and ethylbenzene, ketone compounds such as acetone, methyl ethyl ketone and methyl isobutyl ketone, and ethers such as ethyl Cellosolve and dimethyl Cellosolve.

A vinyl compound copolymerizable with styrene and/or (meth)acrylic acid may be used as a comonomer in the process of this invention. Examples of the polymerizable vinyl compound include (meth)acrylates such as methyl methacrylate, methyl acrylate, ethyl methacrylate, ethyl acrylate, butyl methacrylate and butyl acrylate; aromatic vinyl compounds such as alpha-methylstyrene, p-methylstyrene and p-t-butylstyrene; vinyl-substituted nitriles such as acrylonitrile and methacrylonitrile, and polymerizable acid anhydrides such as maleic anhydride.

A known organic peroxide or a molecular weight controller may be used to adjust the rate of polymerization or the molecular weight of the copolymer.

The copolymer obtained by the process of the invention is composed of random bonding of styrene units and (meth)acrylic acid units. The (meth)acrylic acid units play a role of improving heat resistance, and their content is usually 3 to 30% by weight based on the weight of the copolymer. Particularly, when the contents of the (meth)acrylic acid units is 5 to 25% by weight, the resulting copolymer further has excellent moldability in extrusion or injection molding.

The copolymer produced by this invention must have a suitable molecular weight in order to use it as a molding material. The suitable molecular weight corresponds to a solution viscosity of the copolymer, determined for a 10% by weight solution of the copolymer in dry tetrahydrofuran at 25° C, of 5 to 75 centistokes. Preferably, the copolymer has a molecular weight corresponding to a solution viscosity of 10 to 80 centistokes because it has excellent strength and moldability within this molecular weight range.

The copolymer produced by the process of this invention can be directly fabricated by injection molding, extrusion, etc. As required, conventional additives such as antioxidants, heat stabilizers, plasticizers and lubricants may be added during polymerization or pelletization in amounts which do not impair the properties of the copolymer.

The resulting styrene/(meth)acrylic acid copolymer so obtained may be subjected to molding of thermoplastic resins, and can be molded into various articles such as extrusion-molded articles such as films, sheets or plates, biaxially stretched extrusion-molded articles such as biaxially stretched sheets or films, foamed extrusion-molded articles such as foamed sheets and boards, blow-molded articles and injection-molded articles.

The following Examples and Comparative Examples illustrate the present invention more specifically.

BRIEF DESCRIPTION OF THE DRAWINGS

In the accompanying drawings.

The properties of the copolymers and molded articles obtained in these examples were evaluated by the following methods.

(1) Solution viscosity

The viscosity at 25° C of a 10% by weight solution of the styrene/(meth)acrylic acid copolymer in tetrahydrofuran dried with anhydrous sodium sulfate was measured by using a Cannon-Fenske viscometer (#200).

(2) Heat distortion temperature

Measured in accordance with ASTM D648 (load 284 psi).

(3) Occurrence of flow marks in a molded article

The copolymer was molded by a 4-ounce injection-molding machine (screw type V20-140 made by Nippon Seikosho K. K.) into a radio cabinet having a size of 200 × 120 × 20 mm, and the occurrence of flow marks was determined by visual observation.

(4) Haze of a molded article

As a measure of the haze of the article, its light transmission was evaluated in actual use under a lamp light. Specifically, using the device shown in FIG. 2, light emitted from a miniature lamp was transmitted through a test piece (128 × 12.8 × 6.4 mm) covered with an aluminum foil at its incoming end surface and an outgoing end surface from the incoming end surface toward the outgoing end surface, and the illuminance at a point 100 mm away from the outgoing end surface of the test piece was measured by an illuminometer.

Figure 2:
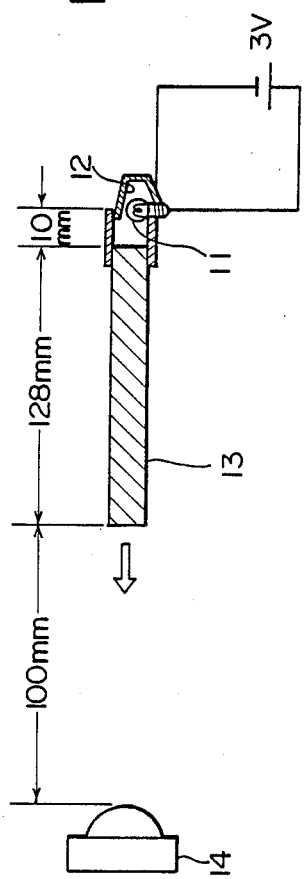
FIG. 2 is a diagram showing a device for testing the haze of a molded article of the SMAA resin obtained by the invention.

In FIG. 2, the reference numeral 11 represents the miniature lamp; 12, a reflecting plate; 13, the test piece; and 14, the illuminometer.

EXAMPLE 1

SMAA resin was produced by using a polymerization apparatus comprised of three 12-liter polymerization vessels each equipped with a stirrer and feeding methacrylic acid so that the content of methacrylic acid units in the SMAA resin formed in each of the polymerization vessels was about 10% by weight.

Specifically, a mixture composed of 89.5% by weight of styrene, 5.5% by weight of methacrylic acid and 5% by weight of ethylbenzene was continuously fed at a speed of 5 kg/hour into a first polymerization vessel (I) maintained at 132° C. While the polymerization solution which overflowed from the first polymerization vessel (I) was continuously conveyed to a second polymerization vessel (II) maintained at 132° C, a mixture of 50% by weight of methacrylic acid and 50% by weight of ethylbenzene was continuously fed into the second polymerization vessel at a speed of 130 g/hour. Then, while the polymerization solution which overflowed from the second polymerization vessel (II) was conveyed to a third polymerization vessel (III) maintained at 132° C, a mixture of 50% by weight of methacrylic acid and 50% by weight of ethylbenzene was continuously fed into the third polymerization vessel (III) at a speed of 90 g/ hour. Then, to the polymerization solution which overflowed from the third polymerization vessel (III) was added 2% by weight, based on the polymerization solution, of water (VV). The polymerization solution was heated to 240° C by a pre-heater (1) and then continuously fed into a solvent removing vessel (2) at 240° C and 20 torr to remove the solvent. The copolymer was obtained at a rate of 3.3 kg/hour.

When the polymerization system reached a steady state, the resulting copolymer was analyzed and evaluated. The results are shown in Table 1.

Figure 1:
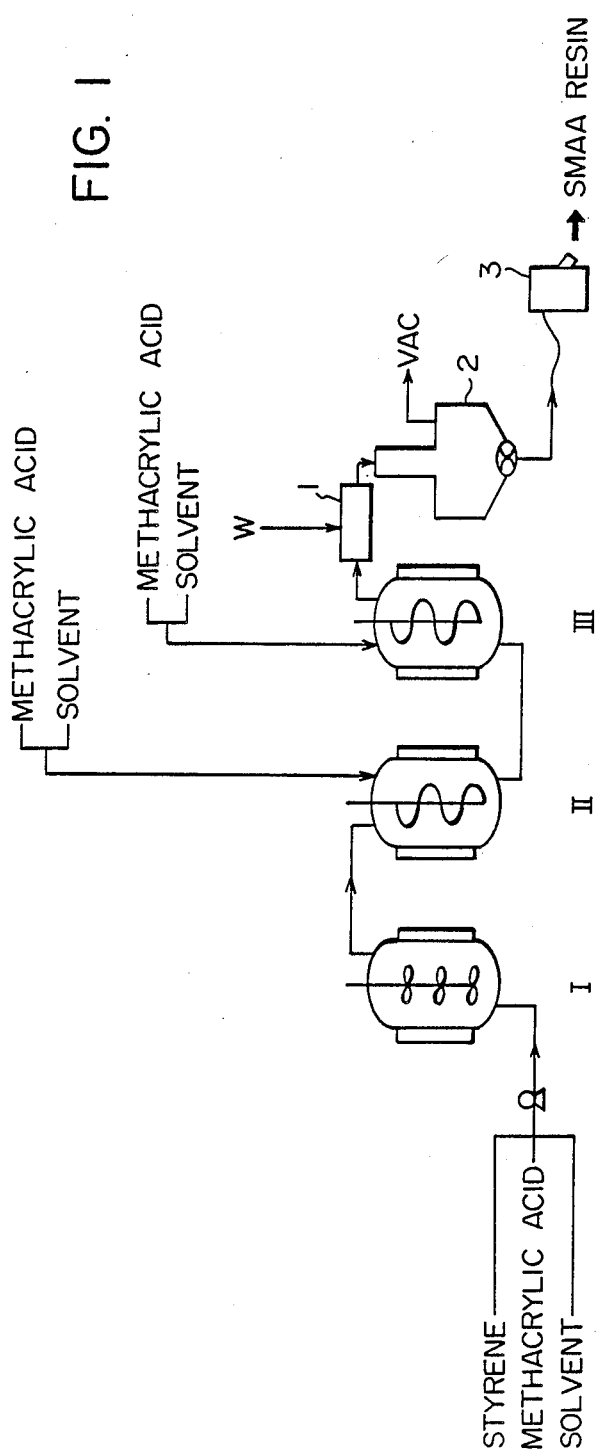
FIG. 1 is a flowsheet showing the process for producing SMAA resin in Examples.

The apparatus shown in FIG. 1 was operated by the following procedure.

In this apparatus, the three polymerization vessels (I), (II) and (III) each having an inner capacity of 12 liters and equipped with a jacket and a mixing device were arranged in series, and after the third polymerization vessel (III), the preheater (1) with a line for adding water (VV) was disposed, and the solvent removing vessel (2) was further provided following the preheater (1).

A mixture composed of the starting styrene and methacrylic acid and optionally a solvent was fed continuously into the first polymerization vessel (I) by a feed pump at a fixed speed. The contents of the first polymerization vessel were stirred by a turbine impeller mixer, and the temperature of the inside of each of the polymerization vessels was controlled by the jacket.

The inside of each of the polymerization vessels was always maintained full of liquid, and the same amount of the polymerization solution as that of the solution fed by the feed pump overflowed from the first polymerization vessel (I) and was continuously conveyed to the second polymerization vessel and then to the third polymerization vessel.

The second polymerization vessel (II) and the third polymerization vessel (III) were equipped with a double helical stirring impeller. Like the first polymerization vessel (I), they were operated in a completely filled state and the inside temperature was controlled by the jacket.

A nozzle for feeding a mixture of methacrylic acid and as required a solvent was provided in each of the second and third polymerization vessels (II) and (III), and methacrylic acid was continuously fed into the vessels by a pump.

The polymerization solution which overflowed from the third polymerization vessel was heated by preheater (1). The preheater (1) had a nozzle provided therein for addition of water as required.

The polymerization solution fully heated as a result of passing through the preheater (1) was conducted to solvent removing vessel (2) maintained under reduced pressure, and the unreacted monomers, the solvent, etc. were removed by flashing. The copolymer was continuously withdrawn by a gear pump at the bottom portion of solvent removing vessel (2), and pelletized by a pelletizer (3) to give pellets of styrene/methacrylic acid copolymer (SMAA resin).

EXAMPLE 2

SMAA resin was produced by the same apparatus as used in Example 1 while methacrylic acid was fed so that the content of methacrylic acid in the SMAA resin formed in each polymerization vessel became 20% by weight. Specifically, a mixture composed of 70.8% by weight of styrene, 9.4% by weight of methacrylic acid and 20% by weight of ethylbenzene was fed continuously at a speed of 10 kg/hour into the first polymerization vessel kept at 139° C. Then, while the polymerization vessel which overflowed from the first polymerization vessel was conveyed to the second polymerization vessel maintained at 139° C, a mixture composed of 50% by weight of methacrylic acid and 50% by weight of ethylbenzene was continuously fed into the second polymerization vessel at a speed of 360 g/hour. Then, while the polymerization solution which overflowed from the second polymerization vessel was conveyed to the third polymerization vessel, a mixture composed of 50% by weight of methacrylic acid and 50% by weight of ethylbenzene was continuously fed into the third polymerization vessel. Then, water (2% by weight) was added to the polymerization solution which overflowed from the third polymerization vessel. The mixture was heated to 250° C by the preheater, and continuously fed into the solvent removing vessel maintained at 250° C and 20 torr to remove the solvent, and obtain styrene/methacrylic acid copolymer at a rate of 5 kg/ hour.

When the polymerization reaction system reached a steady state, the resulting copolymer was analyzed and evaluated. The results are shown in Table 1.

EXAMPLE 3

Example 1 was repeated except that a mixture of methacrylic acid, ethylbenzene and 100 ppm, based on methacrylic acid, of p-methoxyphenol was used instead of the methacrylic acid/ethylbenzene mixture fed to the second and third polymerization vessels. Styrene/methacrylic acid copolymer was obtained at a rate of 3.2 kg per hour.

The results of analysis and evaluation are shown in Table 1.

The polymerization solutions in the second and third polymerization vessels had a viscosity of more than 30 poises.

EXAMPLE 4

Example 2 was repeated except that a mixture of methacrylic acid, ethylbenzene and 200 ppm, based on methacrylic acid, of p-methoxyphenol was used instead of the methacrylic acid/ethylbenzene mixture fed to the second and third polymerization vessels. SMAA resin was obtained at a rate of 4.9 kg per hour. The results of analysis and evaluation are shown in Table 1.

The polymerization solutions in the second and third polymerization vessels had a viscosity of more than 30 poises.

EXAMPLE 5

SMAA resin was produced by using the same apparatus as used in Example 1 while methacrylic acid was fed so that the content of methacrylic acid in the SMAA resin formed in each of the polymerization vessels became 15% by weight. Specifically, a mixture composed of 84% by weight of styrene, 8% by weight of methacrylic acid and 8% by weight of toluene was continuously fed at a speed of 8 kg/hour into the first polymerization vessel kept at 135° C. Then, while the polymerization solution which overflowed from the first polymerization vessel was conveyed to the second polymerization vessel kept at 135° C, methacrylic acid containing 50 ppm of 2,4-dimethyl-6-tert-butylphenol was continuously fed into the second polymerization vessel at a speed of 135 g/hour. Then, while the polymerization solution which overflowed from the second polymerization vessel was conveyed to the third polymerization vessel kept at 135° C, methacrylic acid containing 50 ppm of 2,4-dimethyl-6-tert-butylphenol was continuously fed into the third polymerization vessel at a rate of 100 g/hour. Water (2% by weight) was added to the polymerization solution which overflowed from the third polymerization vessel, and the mixture was heated to 240° C by the preheater, and continuously fed into the solvent removing vessel kept at 240° C and 20 torr to remove the solvent and obtain SMAA resin at a rate of 4.7 kg/hour.

The polymerization solutions in the second and third polymerization vessels had a viscosity of more than 30 poises.

After the polymerization reaction system reached a steady state, the resulting copolymer was analyzed and evaluated. The results are shown in Table 1.

COMPARATIVE EXAMPLE 1

A mixture composed of 87.5% by weight of styrene, 7.5% by weight of methacrylic acid and 5% by weight of ethylbenzene was fed continuously into the first polymerization vessel kept at 132° C of the same apparatus as used in Example 1 at a speed of 5 kg/hour. The polymerization solution which overflowed from the first polymerization vessel was conveyed to the second polymerization vessel kept at 132° C, and the polymerization solution which overflowed from the second polymerization vessel was then conveyed to the third polymerization vessel kept at 132° C. The polymerization solution which overflowed from the third polymerization vessel was treated as in Example 1 to remove the solvent from it and obtain SMAA copolymer at a rate of 3.5 kg/ hour. The results of analysis and evaluation are shown in Table 1.

COMPARATIVE EXAMPLE 2

A mixture composed of 81.5% by weight of styrene, 10.5% by weight of methacrylic acid and 8% by weight of toluene was fed continuously into the first polymerization vessel kept at 135° C of the same apparatus as used in Example 1 at a speed of 8 kg/hour. The polymerization solution which overflowed from the first polymerization vessel was conveyed to the second polymerization vessel kept at 135° C, and the polymerization solution which overflowed from the second polymerization vessel was then conveyed to the third polymerization vessel kept at 135° C. The polymerization solution which overflowed from the third polymerization vessel was treated as in Example 1 to remove the solvent from it and obtain SMAA copolymer at a rate of 5.3 kg/ hour. The results of analysis and evaluation are shown in Table 1.

COMPARATIVE EXAMPLE 3

A mixture composed of 89% by weight of styrene, 11% by weight of methacrylic acid and 20% by weight of ethylbenzene was fed continuously into the first polymerization vessel kept at 139° C of the same apparatus as used in Example 1 at a speed of 10 kg/hour. The polymerization solution which overflowed from the first polymerization vessel was conveyed to the second polymerization vessel kept at 139° C, and the polymerization solution which overflowed from the second polymerization vessel was then conveyed to the third polymerization vessel kept at 139° C. The polymerization solution which overflowed from the third polymerization vessel was treated as in Example 2 to remove the solvent from it and obtain SMAA copolymer at a rate of 5.3 kg/hour. The results of analysis and evaluation are shown in Table 1.

COMPARATIVE EXAMPLE 4

To show the significance of the heat resistance of the SMAA resin produced by the process of this invention, commercial polystyrene resin (DIC STYRENE CR-3500, a product of Dainippon Ink and Chemicals, Inc.) was tested.

EXAMPLE 6

The mixture of styrene, methacrylic acid and ethylbenzene recovered from the solvent removing vessel in the procedure of Example 1 was rectified to separate it into the individual components. Methacrylic acid was recovered at a rate of 50 g per hour. Example 3 was repeated except that a mixture of the recovered methacrylic acid, ethylbenzene and 100 ppm, based on it, of p-methoxyphenol was fed to the third polymerization vessel. SMAA resin was obtained at a rate of 3.2 kg/hour.

The resin was analyzed and evaluated, and the results are shown in Table 1.

The polymerization solutions in the second and third polymerization vessels had a viscosity of more than 30 poises.

EXAMPLE 7

By using the same apparatus as used in Example 1, SMAA resin was produced while methacrylic acid was fed so that the content of methacrylic acid in the SMAA resin formed in each of the polymerization vessel became 10% by weight. Specifically, a mixture composed of 89% by weight of styrene, 6% by weight of methacrylic acid and 5% by weight of ethylbenzene was continuously fed at a speed of 4 kg/hour into the first polymerization vessel kept at 132° C. Then, while the polymerization solution which overflowed from the first polymerization vessel was conveyed to the second polymerization vessel kept at 132° C, a mixture of 10% by weight of methacrylic acid, 90% by weight of styrene and 100 ppm, based on methacrylic acid, of p-methoxyphenol was continuously fed into the second polymerization vessel at a speed of 1100 g/hour. Then, while the polymerization solution which overflowed from the second polymerization vessel was conveyed to the third polymerization vessel kept at 132° C. Water (2% by weight) was added to the polymerization solution which overflowed from the third polymerization vessel, and the mixture was heated to 250° C by the preheater and continuously fed into the solvent removing vessel kept at 250° C and 20 torr to remove the solvent and obtain SMAA resin at a rate of 3.5 kg/hour.

After the polymerization system reached a steady state, the resulting copolymer was analyzed and evaluated. The results are shown in Table 1.

The polymerization solutions in the second and third polymerization vessels had a viscosity of more than 30 poises.

EXAMPLE 8

By using the same apparatus as used in Example 1, SMAA resin was produced while methacrylic acid was fed so that the content of methacrylic acid in the SMAA resin formed in each of their polymerization vessels became 20% by weight. Specifically, a mixture composed of 70% by weight of styrene, 10% by weight of methacrylic acid and 20% by weight of ethylbenzene was continuously fed at a speed of 8 kg/hour into the first polymerization vessel kept at 139° C. While the polymerization solution which overflowed from the first polymerization vessel was conveyed to the second polymerization vessel kept at 139° C, a mixture composed of 20% by weight of methacrylic acid, 80% by weight of styrene and 200 ppm, based on methacrylic acid, of p-methoxyphenol was continuously fed into the second polymerization vessel at a speed of 360 g/hour. Then, while the polymerization solution which overflowed from the second polymerization vessel was conveyed to the third polymerization vessel kept at 139° C, a mixture of 20% by weight of methacrylic acid, 80% by weight of styrene and 200 ppm, based on methacrylic acid, of p-methoxyphenol was continuously fed into the second polymerization vessel at a rate of 480 g/hour. Water (2% by weight) was added to the polymerization solution which overflowed from the third polymerization vessel, and the mixture was heated to 250° C by the preheater, and continuously fed into the solvent removing vessel kept at 250° C and 20 torr to remove the solvent and obtain SMAA resin at a rate of 5.3 kg/hr.

After the polymerization reaction system reached a steady state, the resulting copolymer was analyzed and evaluated. The results are shown in Table 1.

The polymerization solutions in the second and third polymerization vessels had a viscosity of more than 30 poises.

TABLE 1

|  | Unit | Example | | | | | Comparative Example | | | | Example | | |
| --- | --- | --- | --- | --- | --- | --- | --- | --- | --- | --- | --- | --- | --- |
|  |  | 1 | 2 | 3 | 4 | 5 | 1 | 2 | 3 | 4 | 6 | 7 | 8 |
| Content of methacrylic acid units in the polymer | wt. % | 10.1 | 19.6 | 10.3 | 20.0 | 15.3 | 10.1 | 14.9 | 20.1 | — | 10.0 | 9.9 | 19.8 |
| Solvent viscosity | cst | 35 | 19 | 34 | 18 | 27 | 35 | 28 | 18 | — | 35 | 36 | 20 |
| Heat distortion temperature | °C. | 108 | 122 | 108 | 123 | 114 | 107 | 113 | 121 | 85 | 108 | 108 | 123 |
| Occurrence of flow marks |  | No | No | No | No | No | Yes | Yes | Yes | No | No | No | No |
| Haze | lux | 80 | 75 | 90 | 88 | 89 | 45 | 40 | below 30 | 90 | 89 | 92 | 91 |

According to this invention, styrene/(meth)-acrylic acid copolymer having both high transparency and heat resistance can be produced by using two or more polymerization tanks each equipped with a mixing device which are suitable for commercial production. Molded articles prepared from the styrene/(meth)acrylic acid copolymer obtained by the process of this invention find extensive use because they are free from flow marks and have very high transparency and heat resistance. Specific examples of its use include covers of illluminating devices such as a fluorescent lamp cover and a lamp shade; components of low-voltage electrical appliances, such as audio cassettes, compact discs, optical discs, parts of coffee makers and closures of driers; automobile parts such as prism lenses, inner lenses, lamps and lamp covers of car meters or car audios, windshields and ceiling materials of tractors; heat-resistant food containers such as noodle cups and steamable containers; food containers which can be heated in an electronic oven, for example, containers for various types of foods including chilled foods and dried foods and lunch boxes; medical instruments such as trays, artificial organs, animal keeping boxes and petri dishes; and components of a copying machine, such as lenses, trays and bins.

We claim:

1. A process for producing a styrene/(meth)acrylic acid copolymer continuously by a bulk or solution polymerization technique, wherein the polymerization is carried out at least substantially continuously by using at least two polymerization vessels arranged in series and each being equipped with a mixing device while (meth)acrylic acid is at least substantially continuously fed into each of the polymerization vessels and wherein styrene and (meth)acrylic acid are fed into the first polymerization vessel of said series.

2. The process of claim 1 in which (meth)acrylic acid containing 30 to 400 ppm of a polymerization inhibitor is at least substantially continuously fed into the polymerization vessel in which the contents have a viscosity of at least 30 poises.

3. The process of claim 2 in which part of (meth)acrylic acid is (meth)acrylic acid recovered from the polymerization system.

4. The process of claim 2 in which the styrene/(meth)acrylic acid copolymer is composed of 97% to 70% by weight of styrene units and, 3% to 30% by weight of (meth)acrylic acid units, and has a viscosity, determined at 25° C for its 10% by weight dry tetrahydrofuran solution, of 5 to 75 centistokes.

5. The process of claim 2 in which (meth)acrylic acid is used after it is diluted with styrene or a mixture of styrene and a solvent to not more than 50 times.

6. A process for producing a styrene/(meth)-acrylic acid copolymer by carrying out bulk or solution copolymerization of styrene and meth(acrylic) acid in at least two polymerization vessels arranged in series, which comprises feeding styrene and (meth)acrylic acid at least substantially continuously into the first polymerization vessel of said series while stirring the contents of said vessel and allowing styrene and (meth)acrylic acid to copolymerize by bulk or solution copolymerization;

at least substantially continuously transferring the contents of said first polymerization vessel successively to each remaining polymerization vessel in said series;

at least substantially continuously feeding (meth)acrylic acid and, optionally, styrene, to each of said remaining polymerization vessels while stirring the contents of said vessels, and recovering styrene/(meth)acrylic acid copolymer from the last polymerization vessel in said series.

7. The process of claim 6 wherein styrene and (meth)acrylic acid are fed into the first polymerization vessel as a solution in a solvent and wherein (meth)acrylic acid is fed into each remaining polymerization vessel as its solution in a solvent.

8. The process of claim 6 wherein methacrylic acid is used to form a styrene/methacrylic acid copolymer.

9. The process of claim 6 which is carried out continuously.

10. The process of claim 6 wherein methacrylic acid and styrene are fed to said successive polymerization vessels.

11. The process of claim 6 which comprises from 2 to 6 polymerization vessels in said series.

12. The process of claim 6 which comprises 3 polymerization vessels in said series.

13. The process of claim 6 wherein said copolymer contains from 5 to 25% by weight of (meth)acrylic acid and has a solution viscosity, determined at 25° C for its 10% by weight dry tetrahydrofuran solution, of 10 to 80 centistokes.

* * * * *